(12) United States Patent
Shimizu et al.

(10) Patent No.: US 9,477,923 B2
(45) Date of Patent: Oct. 25, 2016

(54) RF TAG

(71) Applicant: TOYO SEIKAN GROUP HOLDINGS, LTD., Tokyo (JP)

(72) Inventors: Hironaga Shimizu, Kanagawa (JP); Shinya Akamatsu, Kanagawa (JP); Takayuki Kikuchi, Tokyo (JP)

(73) Assignee: TOYO SEIKAN GROUP HOLDINGS, LTD., Tokyo (JP)

(*) Notice: Subject to any disclaimer, the term of this patent is extended or adjusted under 35 U.S.C. 154(b) by 0 days.

(21) Appl. No.: 14/581,113

(22) Filed: Dec. 23, 2014

(65) Prior Publication Data
US 2015/0108222 A1    Apr. 23, 2015

Related U.S. Application Data

(63) Continuation of application No. PCT/JP2013/003831, filed on Jun. 20, 2013.

(30) Foreign Application Priority Data

Jun. 26, 2012 (JP) ................................ 2012-143328
Mar. 28, 2013 (JP) ................................ 2013-070055

(51) Int. Cl.
*G06K 19/02* (2006.01)
*G06K 19/077* (2006.01)
(Continued)

(52) U.S. Cl.
CPC ... *G06K 19/07794* (2013.01); *G06K 19/07722* (2013.01); *G06K 19/07771* (2013.01); *G06K 19/07786* (2013.01); *H01Q 1/2225* (2013.01); *H01Q 1/38* (2013.01); *H01Q 9/065* (2013.01)

(58) Field of Classification Search
CPC ............... B42D 15/10; G06K 19/077; G06K 19/07749; G06K 19/06187; G06K 19/06037; G06K 19/12; G06K 7/14; G07F 7/1008; G06Q 20/341

USPC .................... 235/488, 487, 492, 493, 380
See application file for complete search history.

(56) References Cited

U.S. PATENT DOCUMENTS 8,742,895 B2   6/2014   Yoshida et al.
9,361,574 B2   6/2016   Yoshida et al.
(Continued)

FOREIGN PATENT DOCUMENTS

CN      1773532 A        5/2006
CN    101836328 A        9/2010
(Continued)

OTHER PUBLICATIONS

EPO Communication with Extended European Search Report dated Nov. 30, 2015, issued by the European Patent Office in related European Application No. 13810460.9 (9 pages).
(Continued)

*Primary Examiner* — Karl D Frech
(74) *Attorney, Agent, or Firm* — Osha Liang LLP

(57) ABSTRACT

An RF tag has an inlay with an IC chip and an antenna, a planar auxiliary antenna laminated on the inlay in an insulating state, a dielectric constant regulation plate which becomes a base on which the inlay including the auxiliary antenna laminated thereon is mounted, and functions as a dielectric constant regulation layer for the mounted inlay, and a case which receives the dielectric constant regulation plate in a state where the inlay including the auxiliary antenna laminated thereon is mounted. The dielectric constant regulation plate is formed into a shape which allows the dielectric constant regulation plate to be attachably/detachably and non-movably engaged in the case and which allows the dielectric constant regulation plate to have a predetermined dielectric constant which regulates communication characteristics of the inlay including the auxiliary antenna laminated thereon.

9 Claims, 11 Drawing Sheets

(51) Int. Cl.
*H01Q 1/38* (2006.01)
*H01Q 1/22* (2006.01)
*H01Q 9/06* (2006.01)

(56) References Cited

U.S. PATENT DOCUMENTS

| | | | |
|---|---|---|---|
| 2006/0109132 A1 | 5/2006 | Oishi et al. | |
| 2010/0127084 A1* | 5/2010 | Pavate | G06K 19/07749 |
| | | | 235/492 |
| 2010/0245049 A1 | 9/2010 | Yoshida et al. | |
| 2011/0180609 A1 | 7/2011 | Sato et al. | |
| 2014/0224885 A1 | 8/2014 | Yoshida et al. | |

FOREIGN PATENT DOCUMENTS

| | | |
|---|---|---|
| EP | 2045764 A1 | 4/2009 |
| JP | 2002-298106 A | 10/2002 |
| JP | 2006-203852 A | 8/2006 |
| JP | 2008-123196 A | 5/2008 |
| JP | 2008-191918 A | 8/2008 |
| JP | 2008-210023 A | 9/2008 |
| JP | 2008-299424 A | 12/2008 |
| JP | 2009-093339 A | 4/2009 |
| JP | 2010-263336 A | 11/2010 |
| KR | 2012-0007413 A | 1/2012 |

OTHER PUBLICATIONS

Written Opinion from corresponding International Application No. PCT/JP2013/003831 mailed Jan. 8, 2015 (8 pages).
International Search Report for corresponding International Application No. PCT/JP2013/003831, mailed Jul. 23, 2013 (1 page).
Office Action mailed Oct. 29, 2015, by the Korean Patent Office in corresponding Korean Patent Application No. KR 10-2014-7035386 (5 pages).
Office Action in corresponding Chinese Patent Application No. 201380033241.X dated Jul. 4, 2016, with translation (18 pages).

* cited by examiner 12 11a 11 12 13
      10

λ/2

21   20

RF TAG

CROSS-REFERENCE TO RELATED APPLICATIONS

This application claims the benefit of International Patent Application No. PCT/JP2013/003831, filed on Jun. 20, 2013, Japanese Patent Application JP2013-070055 filed on Mar. 28, 2013, and Japanese Patent Application JP2012-143328, filed on Jun. 26, 2012, all of which are incorporated by reference in their entirety.

TECHNICAL FIELD

One or more embodiments of the present invention relate to an RF tag which is attached to and used on each of various articles and objects such as electricity meters and containers for cargos, and more particularly, it relates to an RF tag of a structure where an inlay of the RF tag is received and sealed in a case to improve a weather resistance and a water repellence.

Furthermore, one or more embodiments of the present invention particularly relates to an RF tag which is attachable to a curved portion of the surface of each of columnar members such as metal pipes forming cage trucks and cart racks for use in conveyance, storage and the like of commodities.

BACKGROUND

In general, so-called RF tags including IC chips, in which predetermined information on articles and objects is readably and writably stored, are broadly used to the various articles and objects.

The RF tag is also called an RFID (Radio Frequency Identification) tag, an IC tag, a non-contact tag or the like. The RF tag is a microminiature communication terminal, which is obtained by shaping, in the form of a tag (baggage tag), a so-called inlay (inlet) where an electronic circuit including an IC chip and a radio antenna is sealed or coated with a substrate such as a resin film. In the RF tag, reading-only the predetermined information from the IC chip, writing-once it in the IC chip, and reading it therefrom and writing it therein are possible by a reader/writer via radio.

Furthermore, when the predetermined information is written in such an RF tag and the thus treated RF tag is then attached to, e.g., each of various articles and objects, the information recorded in the RF tag is picked up by the reader/writer, to enable recognition, output, display, update and the like of the information recorded in the tag as the predetermined information on the articles.

In such an RF tag, several hundred bits to several kilobits of data can be recorded in a memory of the IC chip, and a sufficient amount of the information can be recorded as the information on each of the articles and the like. Furthermore, communication can be performed with a reading/writing device side in a non-contact manner, and hence there is no fear of wear, damage, dirt or the like on a contact. Additionally, the tag itself can include no power source, and hence processing, miniaturization and thinning of the tag can be performed in compliance with each object.

Furthermore, by use of such an RF tag, it is possible to record various pieces of information on each article to which the tag is attached, e.g., a name, an identification symbol, a content, components, a manager, a user, a use state, a use situation and a date of the article. Therefore, a large variety of pieces of information, which are impossible by characters, a bar code or the like printed and displayed on the surface of a label, can correctly be read and written simply by attaching the miniaturized and thinned tag to the article.

However, when this RF tag is attached to, e.g., each of articles and objects made of a metal, the RF tag is disadvantageously influenced by a conductivity of the metal, which causes difficulty in radio communication.

That is, when the RF tag is attached to each article, a magnetic flux is generated by the RF tag in such a direction as to pass through the article. Therefore, when the tag is attached to the article made of the metal, magnetic waves or electromagnetic waves emitted by an antenna section are absorbed on a metal side to disadvantageously generate a heat loss or the like, thereby causing a situation where communication characteristics of the tag are impaired. Therefore, when the usual RF tag for general use is attached to each of the articles and objects made of the metal as it is, the tag may incorrectly operate or the radio communication with the reader/writer may not be able to be performed.

Patent Documents 1 and 2 suggested that when the RF tag is attached to each metal article, a constitution of the RF tag is changed to a constitution for exclusive use in the metal to avoid the influence from the metal.

Specifically, in the heretofore suggested RF tag for the metal, reflecting means or a dielectric substance formed in a sheet state or the like is disposed in the tag on a side facing the metal which becomes an attaching object. Furthermore, the magnetic flux emitted by the tag is reflected by this reflecting means or dielectric substance, or passes through the dielectric substance, thereby preventing the generation of the heat loss or the like from being caused by absorbing the magnetic waves or electromagnetic waves on the metal side.

Furthermore, in addition to the abovementioned influence from each of the metal articles, the RF tag in a state of the inlay where the IC chip and the antenna are simply coated with the film easily receives an influence by an impact, water, temperature change or the like, and there is the disadvantage that a failure, wrong operation, breakdown or the like easily occurs.

Therefore, Patent Document 3 suggested that the RF tag in the state of the inlay is received and sealed in, e.g., a case made of a resin, to improve a weather resistance, a heat resistance, and a water repellence.

Furthermore, Patent Documents 4 and 5 taught that RF tags may be attached to metal pipes constituting trucks made of a metal or the like, e.g., a cage truck and a cart rack shown in FIG. 9A and FIG. 9B.

When "an IC tag device" for a metal as suggested in Patent Document 4 is attached to the metal pipe constituting the truck made of the metal, an inlet of an RF tag is sandwiched between a packing section to be fixed to the metal pipe and a protective layer disposed on an outer side of the packing section, to avoid an influence from the metal pipe.

Furthermore, in "a radio IC tag holder" disclosed in Patent Document 5, when a radio IC tag (an RF tag) is attached to the metal pipe, the radio IC tag is received in the holder which is to be wound around and attached to an outer periphery of the metal pipe and which comprises an electromagnetic wave cutoff layer, whereby the influence from the metal pipe is avoided.

CITATION LIST

Patent Documents

[Patent Document 1] Japanese Patent Application Publication No. 2002-298106
[Patent Document 2] Japanese Patent Application Publication No. 2008-123196
[Patent Document 3] Japanese Patent Application Publication No. 2008-191918
[Patent Document 4] Japanese Patent Application Publication No. 2008-210023
[Patent Document 5] Japanese Patent Application Publication No. 2008-299424

However, in a heretofore proposed RF tag for a metal or a case sealing type of RF tag, reflecting means, a dielectric substance, a case and the like are constituted of fixed and exclusive structures, materials and the like corresponding only to a specific metal article or communication frequency. Therefore, to constitute the RF tag for use in a different article or at a different communication frequency, all the structures and materials of the reflecting means, the dielectric substance and the case have to be changed or remade.

In consequence, the RF tag disadvantageously hardly has general-use properties or expandability.

When the RF tag is used in, e.g., an electricity meter to monitor a power consumption, communication characteristics of the tag are disadvantageously influenced by electricity generated from the electricity meter or the metal constituting the electricity meter. In this case, however, a degree of the influence also varies with an attaching position of the tag to the electricity meter.

Furthermore, when the IC chip or antenna for use in the RF tag varies, a communication frequency of the RF tag also varies. Furthermore, even in the RF tag constituted of the same IC chip and antenna, a communication frequency zone where the tag is usable varies sometimes depending on, e.g., countries or districts. Therefore, for example, when the RF tag is used in, e.g., a container for a cargo to be conveyed to and used in another countries or districts, the RF tag needs to correspond to the respective communication frequencies.

In such a case, in the RF tag of the structure or material fixedly and exclusively corresponding only to the specific metal article or communication frequency as described above, when the communication frequency of the RF tag varies, all constitutional elements of the RF tag have to be changed or remade.

Furthermore, in such a conventional RF tag structure, the reflecting means, the dielectric substance and the case to receive these elements also constitute an exclusively fixed integral structure. Therefore, it is impossible to change, e.g., the only dielectric substance in accordance with the communication frequency.

Therefore, when each article using the RF tag or the communication frequency or a use environment of the RF tag varies, the structure and material of the RF tag and all of the reflecting means, the dielectric substance, the case and the like constituting a part of the RF tag need to be exclusively used for the specific article, communication frequency, use environment or the like. Particularly, to comply with a plurality of articles, frequencies and the like, the RF tag may have poor general-use properties and expandability and manufacturing cost increases.

Furthermore, when an attaching object of the heretofore suggested RF tag for the metal is each of metal pipes constituting cage trucks, cart racks and the like, it is necessary to dispose a large packing or holder to be attached to and wound around an outer periphery of the metal pipe as described in Patent Documents 4 and 5. Therefore, the RF tag (an inlay) for general use cannot be used as it is, and the large packing or holder necessarily has to be prepared.

Such a large packing, holder or the like remarkably requires production cost. Additionally, the whole tag disadvantageously increases its size and weight due to the packing or the holder, which causes an advantage of the small, thin and lightweight RF tag having excellent handling properties to be impaired.

The RF tags can maximize their characteristics that the tags are usable as small and lightweight radio communication means of large storage capacities at low cost, only when the general-use tags (inlays) inexpensively produced in large quantities are used. Therefore, in the conventional structure which requires the large complicated packing or holder to be attached to each of the metal pipes, the merits and characteristics of the RF tags are remarkably reduced.

On the other hand, when the general-use inlay is directly attached to each of the metal pipes constituting the cage trucks and the cart racks as it is, the communication characteristics of the RF tag cannot suitably be obtained due to an influence of the metal pipe. Therefore, when the general-use inlay is attached to the metal pipe, some constitution for the metal needs to be disposed.

Furthermore, the metal pipe constituting each of the cage trucks, the cart racks and the like is usually formed into a cylindrical shape or the like, and an attaching surface to which the RF tag is to be attached often becomes a curved surface having a predetermined curvature. Therefore, even when the constitution for the metal is employed, an attaching structure is required so that the tag can securely be attached to the curved surface of the metal pipe or the like without inadvertently causing any peel, drop-out or the like.

SUMMARY OF THE INVENTION

One or more embodiments of the present invention provide an RF tag suitable for each of metal articles and capable of realizing the RF tag which has a structure for a metal comprising a case to protect an inlay, can broadly cope with even a case where the article using the RF tag or a communication frequency, use environment or the like of the RF tag varies, and is excellent in general-use properties and expandability at low cost.

Furthermore, one or more embodiments of the present invention provide an RF tag to be suitably attached particularly to a curved portion of the surface of each of metal pipes forming cage trucks, cart racks and the like. In this RF tag, a general-use inlay is usable without requiring a large cover, case, holder or the like, while avoiding an influence from the metal. Furthermore, also when an attaching portion is a curved surface, the tag can securely be attached thereto without causing any peel, drop-out or the like.

The RF tag of one or more embodiments of the present invention comprises an inlay comprising an IC chip and an antenna, a planar auxiliary antenna laminated on the inlay in an insulating state to the inlay, a dielectric constant regulation plate which becomes a base on which the inlay including the auxiliary antenna laminated thereon is mounted, and functions as a dielectric constant regulation layer for the mounted inlay, and a case which receives therein the dielectric constant regulation plate in a state where the inlay including the auxiliary antenna laminated thereon is mounted. And the dielectric constant regulation plate is formed into a shape which allows the dielectric constant regulation plate to be attachably/detachably and non-movably engaged in the case and which allows the dielectric constant regulation plate to have a predetermined dielectric constant which regulates communication characteristics of the inlay including the auxiliary antenna laminated thereon.

Furthermore, the RF tag of one or more embodiments of the present invention comprises an inlay comprising an IC chip and an antenna, a planar auxiliary antenna laminated on the inlay in an insulating state to the inlay, and a substrate which becomes a substrate layer on which the laminated inlay and auxiliary antenna are mounted, and functions as a dielectric constant regulation layer for the mounted inlay. And the substrate has a flexibility to be attachable to the surface of a metallic columnar member along a length direction in the form of a band in a surface contact state.

According to one or more embodiments of the present invention, it is possible to realize the RF tag which has a structure for a metal comprising a case to protect an inlay, can broadly cope with even a case where each article using the RF tag or a communication frequency, use environment or the like of the RF tag varies, and is excellent in general-use properties and expandability at low cost.

Therefore, according to one or more embodiments of the present invention, it is possible to realize the RF tag suitable particularly for an electricity meter by which communication characteristics of the RF tag are easily influenced, a container for a cargo for use in countries or districts where a frequency zone usable as the communication frequency of the RF tag varies, or the like.

Furthermore, according to one or more embodiments of the present invention, a general-use inlay is usable without requiring a large or excessive cover, case, holder or the like, while avoiding an influence from the metal. Furthermore, also when an attaching portion is a curved surface, the tag can securely be attached thereto without causing any peel, drop-out or the like.

In consequence, it is possible to realize the RF tag to be suitably attached particularly to a curved portion of the surface of each of metal pipes forming cage trucks, cart racks and the like.

DETAILED DESCRIPTION

Hereinafter, embodiments of an RF tag according to the present invention will be described with reference to the drawings.

First, one or more embodiments of an RF tag according to the present invention will be described with reference to FIGS. 1 to 4.

Figure 1A:
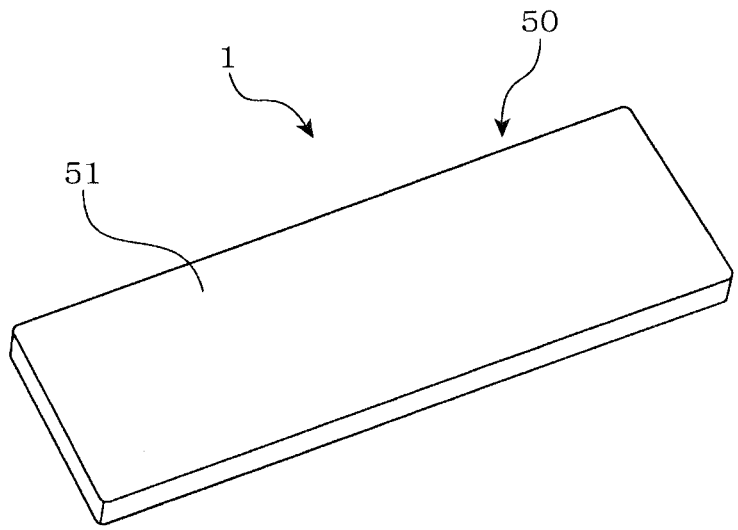
FIG. 1A is a perspective view showing an RF tag according to one or more embodiments of the present invention in a completed state where an inlay is received in a case as seen from a case flat surface side
Figure 1B:
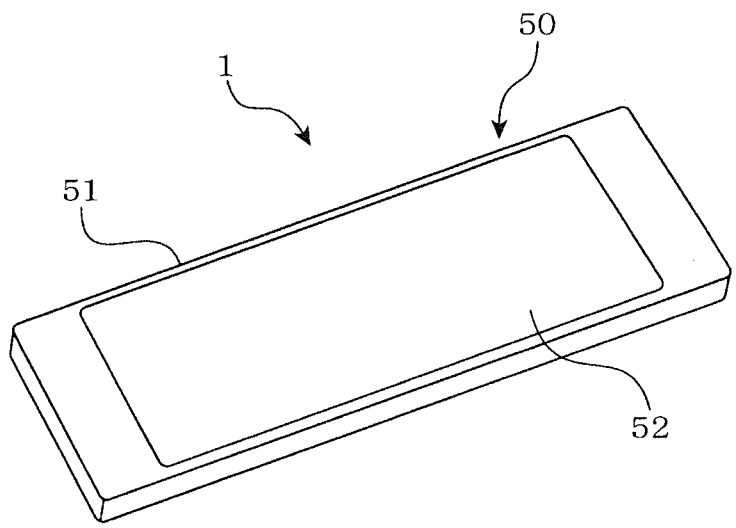
FIG. 1B is a perspective view showing an RF tag according to one or more embodiments of the present invention in a completed state where an inlay is received in a case as seen from a case bottom surface side.
Figure 2:
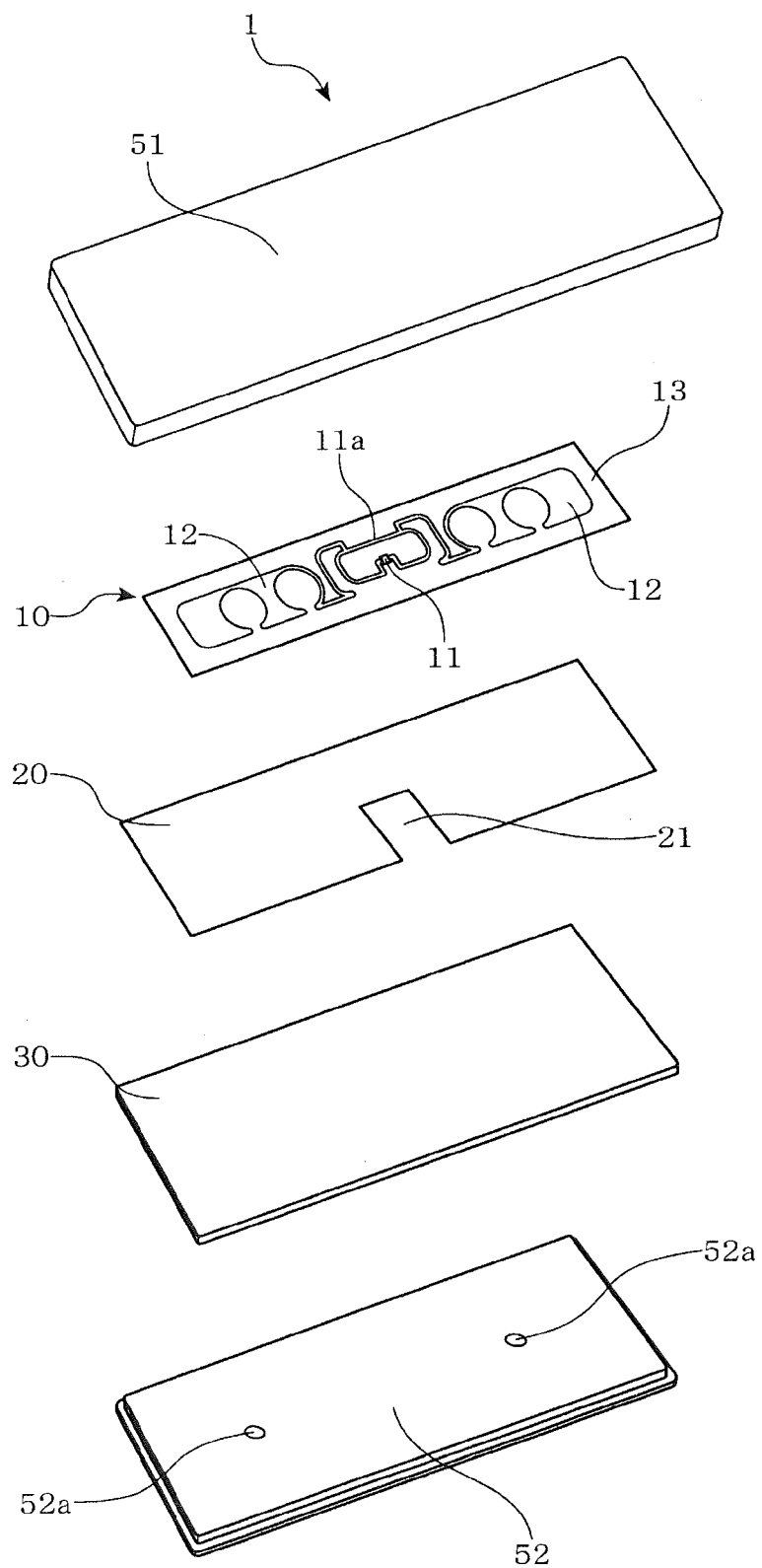
FIG. 2 is a perspective view of a state where all of a case, an inlay, an auxiliary antenna and a dielectric constant regulation plate of the RF tag shown in FIG. 1A are exploded, and shows a state corresponding to FIG. 1A and seen from the case flat surface side according to one or more embodiments.
Figure 3:
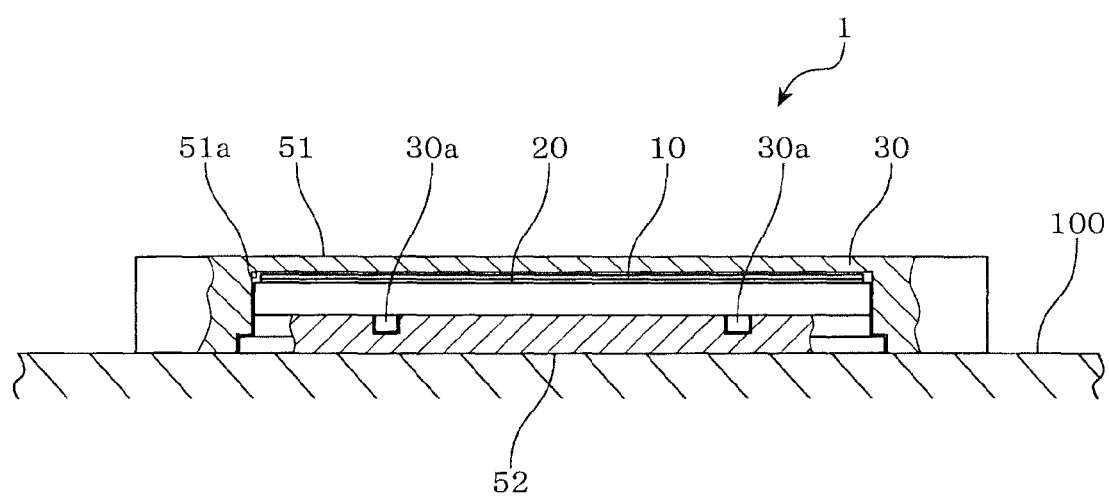
FIG. 3 is a partially sectional front view showing the RF tag according to one or more embodiments of the present invention.

FIG. 1A and FIG. 1B are perspective views showing the RF tag according to one or more embodiments of the present invention in a completed state where an inlay is received in a case, and FIG. 2 is similarly an exploded perspective view of the RF tag according to one or more embodiments. Furthermore, FIG. 3 is a partially sectional front view of the RF tag according to one or more embodiments.

As shown in these drawings, an RF tag 1 according to one or more embodiments is an RF tag of a structure where an inlay 10 constituting the RF tag to perform radio communication is received and protected in a case 50. In this way, the inlay 10 is protected by the case 50, so that a weather resistance, a heat resistance and a water repellence are improved.

Specifically, as shown in FIG. 2, the RF tag 1 according to one or more embodiments is constituted of the inlay 10 comprising an IC chip 11 and an antenna 12; a planar auxiliary antenna 20 laminated on the inlay 10 in an insulating state to the inlay; a dielectric constant regulation plate 30 which becomes a base on which the inlay 10 including the auxiliary antenna 20 laminated thereon is mounted, and functions as a dielectric constant regulation layer for the mounted inlay; and the case 50 which receives therein the dielectric constant regulation plate 30 in a state where the inlay 10 including the auxiliary antenna 20 laminated thereon is mounted.

Furthermore, in the RF tag 1 according to one or more embodiments, the dielectric constant regulation plate 30 is formed into a shape which allows the dielectric constant regulation plate to be attachably/detachably and non-movably engaged in the case 50 and which allows the dielectric constant regulation plate to have a predetermined dielectric constant which regulates communication characteristics of the inlay 10 including the auxiliary antenna 20 laminated thereon.

Hereinafter, the respective parts will be described in detail.

[Inlay]

The inlay 10 constitutes the RF tag to perform reading, writing, or reading and writing of predetermined information between the same and an unshown reader/writer by radio, and there are types such as a read-only type, a write-once type and a read/write type.

Specifically, the inlay 10 has the IC chip 11 and the antenna 12 electrically conductively connected to the IC chip 11, and the IC chip 11 and the antenna 12 are mounted and formed on one sealing film 13 which becomes a substrate and is made of, e.g., a PET resin. Afterward, another sealing film 13 is superimposed thereon, so that the IC chip and the antenna sandwiched between the two sealing films 13 are sealed and protected.

In one or more embodiments, the rectangular inlay 10 sandwiching and sealing the IC chip 11 and the antenna 12 extending on both sides of the IC chip 11 between the rectangular sealing films 13 is used.

The IC chip 11 is constituted of a semiconductor chip such as a memory, and can record, e.g., several hundred bits to several kilobits of data.

In the IC chip 11, a loop-like circuit conductor is connected so as to surround the chip, thereby forming a loop portion 11a, and the antenna 12 is connected to both the right and left sides of the IC chip 11 via the loop portion 11a.

Furthermore, the reading/writing (data calling, registration, deletion, update or the like) by radio communication is performed between the inlay and the unshown reader/writer via the antenna 12 and the after-mentioned auxiliary antenna 20, and the data recorded in the IC chip 11 is recognized.

As the data to be recorded in the IC chip 11, various pieces of data such as an identification code, name, weight, content quantity, manufacturer/seller name, manufacturing place, manufacturing date and use expiration date of a commodity can be recorded and can also be rewritten.

The antenna 12 is formed into a predetermined shape and size (length and area) on the surface of the one sealing film 13 which becomes the substrate by etching processing or the like of, e.g., conductive ink or a metal thin film such as an aluminum vapor deposited film having a conductivity.

The sealing film 13 is constituted of a film material made of, e.g., polyethylene, polyethylene terephthalate (PET), polypropylene, polyimide, polyvinyl chloride (PVC), or acrylonitrile-butadiene-styrene copolymer synthetic resin (ABS) and having a flexibility, and the IC chip 11 and the antenna 12 which are to be sealed are made of a transparent PET resin or the like visible from the outside. Furthermore, on the surface of the film on one surface side of the sealing film 13, a sticky layer or an adhesive layer can be deposited to enable attaching to the substrate or each of articles.

As a communication frequency band for use in the inlay 10, an 860 to 960 MHz band belonging to a so-called UHF band is picked up as a target in the RF tag 1 of one or more embodiments.

In general, as the frequency band for use in the RF tag, there are several types of frequency bands, e.g., a zone of 135 kHz or less, a 13.56 MHz band, an 860 to 960 MHz band belonging to the UHF band, and a 2.45 GHz band. Furthermore, a communication distance enabling the radio communication varies with the frequency band for use, and an optimum antenna length or a wiring pattern varies with the frequency band.

In one or more embodiments, the inlay 10 can be miniaturized and the after-mentioned auxiliary antenna 20 can be formed in a predetermined size, and based on such a relation, the UHF band having a short wavelength and enabling the antenna to be miniaturized is picked up as a target. For example, a 953 MHz band or a 920 MHz band is picked up as the target, and in these frequency bands, suitable communication characteristics can be obtained.

However, when there is not any restriction on the size of the inlay 10 or the auxiliary antenna 20, needless to say, a technical idea according to the present invention in itself is also applicable to a frequency zone other than the UHF band.

[Auxiliary Antenna]

The auxiliary antenna 20 functions as an extra antenna to improve and regulate the abovementioned communication characteristics of the inlay 10. Furthermore, as shown in FIGS. 2 and 3, the auxiliary antenna is constituted of a planar conductive member laminated and disposed on one surface side of the inlay 10, and has an insulating state to the inlay 10 sealed with the resin by the sealing film 13.

That is, the inlay 10 is entirely sealed with the resin by the sealing film 13, and physically has the insulating state to the auxiliary antenna 20 constituted of the conductive member. Furthermore, the auxiliary antenna 20 is directly laminated on the inlay 10, whereby the auxiliary antenna 20 is disposed to face the IC chip 11 of the inlay 10 via the sealing film 13, and electrically connected to the IC chip by so-called capacitor coupling.

Consequently, the auxiliary antenna 20 is laminated on the inlay 10 in a vertical direction (a height direction), whereby the antenna 12 of the inlay 10 and the auxiliary antenna 20 constitute a two-dimensional antenna. Therefore, the auxiliary antenna 20 functions as a booster of communication radio waves, so that the regulation and improvement of the communication characteristics of the inlay 10 are accomplished.

The auxiliary antenna 20 can be formed into a predetermined shape and size (length and area) on the surface of a film which becomes a substrate made of, e.g., a PET resin by etching processing or the like of conductive ink or a metal thin film such as an aluminum vapor deposited film having a conductivity.

Figure 4A:
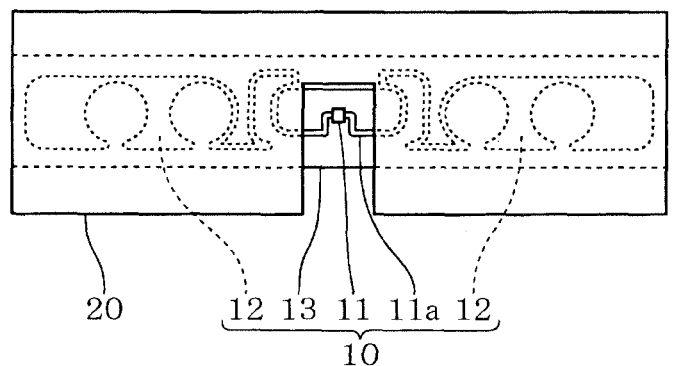
FIG. 4A is a plan view showing the auxiliary antenna of the RF tag according to one or more embodiments of the present invention in a state where the auxiliary antenna is laminated on the inlay
Figure 4B:
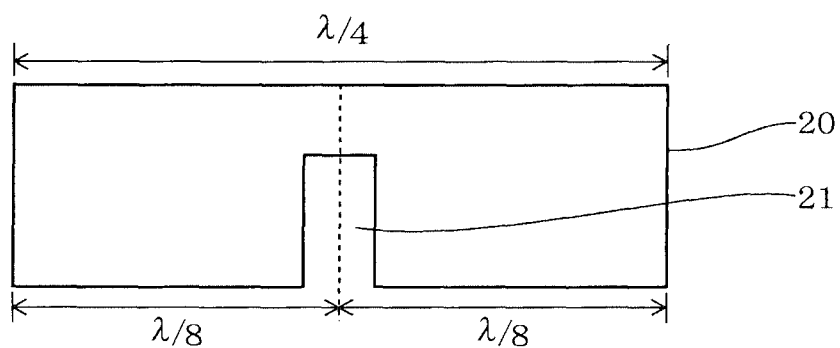
FIG. 4B is a plan view showing the auxiliary antenna of the RF tag according to one or more embodiments of the present invention describing a dimensional relation between long sides of the auxiliary antenna.

FIG. 4A and FIG. 4B shows a plan view of the auxiliary antenna according to one or more embodiments, the drawing FIG. 4A shows a state where the auxiliary antenna is laminated on the inlay, and the drawing FIG. 4B shows a dimensional relation between long sides of the auxiliary antenna.

As shown in the drawing, in one or more embodiments, the auxiliary antenna 20 is formed into a rectangular planar shape which is one size lager than the inlay 10.

Furthermore, especially the rectangular shape is formed so that each long side thereof has a length of substantially ¼ of a wavelength of a radio wave frequency of the inlay 10.

Furthermore, one of the long sides of the rectangular shape is provided with a cutout part 21 which divides the long side into two parts each having a length of substantially ⅛ of the wavelength of the radio wave frequency of the inlay 10.

The cutout part 21 is formed into a concave shape which is opened in an edge portion of the one long side of the auxiliary antenna 20 and has a predetermined width and depth to allow the IC chip 11 of the inlay 10 to be disposed therein.

First, according to a principle of a patch antenna, the auxiliary antenna 20 can be matched by setting the length of each long side of the auxiliary antenna to a length of ½, ¼ or ⅛ of the wavelength of the communication radio wave. On the other hand, the entire size of the RF tag 1 is defined by the length of the auxiliary antenna 20.

In one or more embodiments, the length of the long side of the auxiliary antenna 20 is set to the length of substantially ¼ of the wavelength of the radio wave frequency of the inlay 10 in consideration of a size of the article to which the tag is to be attached.

Further, in a case where the planar auxiliary antenna 20 is laminated on the inlay 10, when the auxiliary antenna 20 is superimposed and positioned on the IC chip 11 of the inlay 10, the communication characteristics of the IC chip 11 are impaired by the conductive member forming the auxiliary antenna 20.

That is, a loop circuit (the loop portion 11a) is formed in the vicinity of the IC chip 11 of the inlay 10, and the loop portion 11a has the purpose of matching an impedance and is disposed to perform communication by a magnetic field component. Therefore, it is necessary to prevent this magnetic field component from being disturbed by a conductor of the auxiliary antenna 20.

Consequently, the cutout part 21 is formed so that the conductive member of the auxiliary antenna 20 is not present in a portion where the IC chip 11 is positioned, when the auxiliary antenna 20 is superimposed and laminated on the inlay 10.

Furthermore, when the cutout part 21 is formed, the cutout part 21 is formed at the position which divides the long side of the auxiliary antenna into two parts each having a length of substantially ⅛ of the wavelength of the radio wave frequency of the inlay 10 so that the length of substantially ¼ of the wavelength of the radio wave frequency of the inlay 10 which is the length of the long side of the auxiliary antenna 20 is changed to the length of substantially ⅛ of the wavelength of the frequency.

It is to be noted that there is not any special restriction on the size (the width and depth) of the cutout part 21, as long as the auxiliary antenna 20 is not superimposed on at least the IC chip 11 of the inlay 10. Furthermore, when the width and depth of the cutout part 21 are suitably regulated, the matching of the impedance can be accomplished in accordance with the radio wave frequency of the IC chip 11, a material of the after-mentioned case 50, an influence from the article to which the RF tag 1 is attached, or the like.

Consequently, there is not any special restriction on the cutout part 21, as long as the cutout part has a size to allow at least the IC chip 11 to be disposed therein and the width and depth of the cutout part can suitably be regulated and changed within a range of the size of the auxiliary antenna 20.

More specifically, for example, when the communication frequency of the inlay 10 is 953 MHz, $\lambda$ nearly equals 314.8 mm, $\lambda/4$ nearly equals 78.7 mm, and $\lambda/8$ nearly equals 39.4 mm.

Therefore, the auxiliary antenna 20 is formed so that the length of each long side is around 78.7 mm, whereby one long side provided with the cutout part 21 is divided into two parts each having a length of around 39.4 mm.

Furthermore, for example, when the communication frequency of the inlay 10 is 920 MHz, $\lambda$ nearly equals 326.0 mm, $\lambda/4$ nearly equals 81.5 mm, and $\lambda/8$ nearly equals 40.8 mm.

Therefore, the auxiliary antenna 20 is formed so that the length of each long side is around 81.5 mm, whereby the one long side provided with the cutout part 21 is divided into two parts each having a length of around 40.8 mm.

It is to be noted that the inlay is usually constituted of two layers of the antenna+a PET layer which becomes the substrate (a UHF tag) or three layers further including an impedance regulation antenna under the PET layer.

Therefore, also in the inlay 10 according to one or more embodiments, a structure including the PET layer sandwiched between the auxiliary antenna 20 as the conductor and the antenna 12 of the inlay 10 produces a wavelength shortening effect. When this PET layer is utilized, an apparent wavelength is shortened. A specific dielectric constant of PET is about "4".

In consequence, the length of the long side of the auxiliary antenna 20 in one or more embodiments also has an approximate value, and the value of substantially $\lambda/4$ or substantially $\lambda/8$ is sufficient. Therefore, the length varies sometimes in accordance with a change of the communication characteristics due to the material of the case 50 of the RF tag 1 or a use environment, use configuration or the like of the tag.

Furthermore, the cutout part 21 is formed in the auxiliary antenna 20 on the basis of a dimension of the inlay 10 for use, and a width and depth of the cutout part are set so that the conductive member of the auxiliary antenna 20 is not superimposed on the portion of the IC chip 11 of the inlay 10.

Specifically, first, the width of the cutout part 21 is set on the basis of a width of the loop portion 11a of the IC chip 11 of the inlay 10, and a size of the cutout part is set so that the conductor of the auxiliary antenna 20 is not superimposed on the IC chip 11 and the loop portion 11a or so that the conductor is not superimposed on the IC chip 11 but is superimposed on a part of a peripheral edge of the loop portion 11a. For example, when a size of the width of the loop portion 11a is from about 15 to 18 mm, the width of the cutout part 21 is a length in a range of about 10 to 20 mm.

Furthermore, the depth of the cutout part 21 is set on the basis of the width of the inlay 10 (a length of a short direction) and a position of an upper portion of the loop portion 11a so that the antenna conductor is not superimposed on at least the IC chip 11. For example, when the width of the inlay 10 is from about 10 to 30 mm, the depth of the cutout part 21 is a length in a range of about 5 to 20 mm.

It is to be noted that when the data is read from and written in the inlay 10, a current flowing through the auxiliary antenna 20 only flows through a peripheral edge portion of the planar auxiliary antenna 20 (skin effect).

The auxiliary antenna 20 has a concave peripheral edge outer shape having the cutout part 21 described above, and in this case, a planar portion can be formed in, e.g., a mesh or lattice state.

As described above, the auxiliary antenna 20 is formed in the mesh state or the like, so that a function of the antenna is not impaired by the skin effect. Furthermore, an area of the whole conductor portion of the auxiliary antenna 20 can be reduced, and a conductor material such as the conductive ink forming the auxiliary antenna 20 can be saved, which can accomplish further cost reduction of the RF tag 1.

[Case and Dielectric Constant Regulation Plate]

The case 50 is protecting means for receiving therein the inlay 10 described above to protect the inlay 10, and the dielectric constant regulation plate 30 including the inlay 10 mounted thereon is attachably/detachably received in the case.

In this way, the inlay 10 is protected by the case 50, so that a weather resistance, heat resistance and water repellence of the RF tag are improved.

Specifically, as shown in FIGS. 1 to 3, the case 50 comprises a case main body 51 comprising a concave portion 51a which becomes a space where the dielectric constant regulation plate 30 on which the inlay 10 including the auxiliary antenna 20 laminated thereon is mounted is non-movably received, and a lid section 52 which closes and seals an opening portion of the concave portion 51a of the case main body 51. And the whole case has a rectangular parallelepiped shape.

It is to be noted that an outer shape, structure and the like of the case 50 can be changed as long as the case can receive therein the dielectric constant regulation plate 30 on which the inlay 10 including the auxiliary antenna 20 laminated thereon is mounted. Furthermore, the outer shape of the case 50 can suitably be designed and changed in accordance with, e.g., a structure or size of each article using the RF tag 1 or a use state or the like of the tag.

The dielectric constant regulation plate 30 becomes a base on which the inlay 10 including the auxiliary antenna 20 laminated thereon is mounted, and functions as a dielectric constant regulation layer for the mounted inlay 10. Furthermore, the dielectric constant regulation plate is constituted of a plate-like member which is attachably/detachably and non-movably engaged with the concave portion 51a of the case main body 51 and received in the case 50. Specifically, as shown in FIG. 2, the dielectric constant regulation plate is formed into a rectangular plate-like shape which is one size lager than the auxiliary antenna 20 laminated on the inlay 10. The dielectric constant regulation plate 30 is engaged with the concave portion 51a of the case main body 51 to be non-movably held therein, and the inlay 10 is received and held in the case.

The lid section 52 is a plate-like lid member which is fitted into an opening portion of the concave portion 51a in a state where the dielectric constant regulation plate 30 is received and engaged, to close the whole opening of the concave portion 51a.

In one or more embodiments, the concave portion 51a of the case main body 51 has a depth which allows the dielectric constant regulation plate 30, on which the inlay 10 including the auxiliary antenna 20 laminated thereon is mounted, to be entirely fitted into the concave portion. Furthermore, the concave portion has a depth which allows the lid section 52 to be fitted and just received in the concave portion in a state where the lid section is superimposed on the dielectric constant regulation plate 30 (see FIG. 3).

Furthermore, in the concave portion 51a, a stepped portion is formed along an opening edge portion. On the other hand, in the lid section 52, a flange-like stepped portion is formed along a peripheral edge. Therefore, in a state where the stepped portions of the concave portion 51a and the lid section 52 abut on and fit into each other to close the concave portion 51a, the lid section 52 is formed as about the same surface as the back surface of the case main body 51 (the so-called same plane) (see FIG. 1B and FIG. 3).

The lid section 52 fitted into the opening of the concave portion 51a to close the concave portion is bonded to the case main body 51 by, e.g., ultrasonic fusion, heat fusion, an adhesive or the like, so that the case 50 is hermetically closed and sealed from the outside.

Furthermore, in the state where the case main body 51 is hermetically closed by the lid section 52, the case 50 is attached to each article or object using the RF tag 1 via, e.g., the adhesive or by fastening screws or the case is disposed, fitted and used in a predetermined portion of the article or object.

Furthermore, in the dielectric constant regulation plate 30 and the lid section 52, convex portions 30a and hole portions 52a can be disposed at corresponding positions, so that in a state where the dielectric constant regulation plate and the lid section are received and engaged in the concave portion 51a to become a mutually engaging concavo-convex structure.

In one or more embodiments, as shown in FIGS. 2 and 3, in the surfaces of the dielectric constant regulation plate 30 and the lid section 52 which face each other, the convex portions 30a, 30a are formed in two portions along a central line of a longitudinal direction on the side of the dielectric constant regulation plate 30, and the hole portions 52a, 52a are formed in two portions along a central line of the longitudinal direction on the side of the lid section 52.

When the convex portions 30a are engaged with the hole portions 52a, the dielectric constant regulation plate 30 is positioned at a predetermined position in the concave portion 51a and simultaneously held by the lid section 52. Consequently, the dielectric constant regulation plate can securely and strongly be held and received in the case 50 (see FIG. 3).

Here, examples of a material of the case 50 and the dielectric constant regulation plate 30 include resin materials including thermoplastic resins such as polycarbonate resin, acrylonitrile-ethylene-styrene copolymer (AES) resin, polypropylene resin, polyethylene resin, polystyrene resin, acryl resin, polyester resin, polyphenylene sulfide resin, acrylonitrile-butadiene-styrene copolymer (ABS) resin, polyvinylchloride resin, polyurethane resin, fluororesin and silicone resin, and thermoplastic elastomers.

In one or more embodiments, it is also easy to perform forming, processing or the like of the dielectric constant regulation plate 30 excellent in weather resistance, heat resistance, water repellence and the like, in accordance with communication characteristics of the inlay 10 as described later. Therefore, the case 50 including the dielectric constant regulation plate 30 is formed particularly by using weather-resistant AES resin or weather-resistant polycarbonate resin.

Furthermore, the case main body 51 and the lid section 52 constituting the case 50 made of such a resin material as described above are formed by using the same resin material.

As described above, the case main body 51 is bonded to the lid section 52 by means such as the ultrasonic fusion, after the opening of the case main body 51 is closed by the lid section 52.

In this way, the case main body 51 and the lid section 52 are formed by using the same resin material, whereby when the case main body is bonded to the lid section by the fusion or the adhesive, both the case main body and the lid section can more securely and strongly be bonded.

However, the case main body 51 and the lid section 52 can be formed by using different materials, as long as they can be bonded and sealed to each other.

Furthermore, in one or more embodiments, the dielectric constant regulation plate 30 described above is formed into a shape which allows the dielectric constant regulation plate to have a predetermined dielectric constant which regulates the communication characteristics of the inlay 10 including the auxiliary antenna 20 laminated thereon, whereby the dielectric constant regulation plate 30 functions as a dielectric constant regulation layer to the inlay 10 mounted and laminated on the dielectric constant regulation plate.

For example, the dielectric constant regulation plate 30 can be formed in a predetermined thickness, and one or more pass-through portions (through holes) to pass through the dielectric constant regulation plate 30 can be disposed in predetermined portions of a mounting surface on which the inlay 10 is mounted.

When the pass-through portions are formed in this way, the dielectric constant regulation plate 30 allows dielectric substances to be partially arranged to the inlay 10 to be mounted.

In consequence, the pass-through portions are suitably formed in the dielectric constant regulation plate 30 in consideration of various conditions such as a type and the communication characteristics of the inlay 10 for use, the material of the case 50 or the dielectric constant regulation plate 30 and each article, use environment, use frequency zone and the like where the RF tag 1 is used. In this case, when the dielectric constant regulation plate 30 is only selected and changed, the RF tag 1 can be used in a different article or can correspond to a different communication frequency.

For example, although it is not especially shown in the drawing, a rectangular pass-through portion which is one size larger than a width of the inlay 10 (a length of a short direction) is formed at a position corresponding to the IC chip 11 and the loop portion 11a of the inlay 10 substantially in the center of the dielectric constant regulation plate 30, and separate pass-through portions are formed at symmetric positions on both sides via this central pass-through portion.

The positions, shape, size, number and the like of the pass-through portions to be formed in the dielectric constant regulation plate 30 in this way can be designed and changed by taking, into consideration or account, conditions such as the type of the resin material forming the dielectric constant regulation plate 30 or the case 50, the communication characteristics or communication frequency of the inlay 10, and the article, use environment, use district and the like where the RF tag 1 is to be used.

Specifically, for example, a case where both of the case 50 (the case main body 51 and the lid section 52) and the dielectric constant regulation plate 30 are made of the weather-resistant AES resin is different from a case where both of the case 50 (the case main body 51 and the lid section 52) and the dielectric constant regulation plate 30 are made of the weather-resistant polycarbonate resin, in terms of the positions, shapes, sizes, number and the like of holes of the pass-through portions to be formed in the dielectric constant regulation plate 30.

Furthermore, in one or more embodiments, the resin material forming the case 50 (the case main body 51 and the lid section 52) and the dielectric constant regulation plate 30 only varies, and the other elements can be formed in the same constitution, shape and dimension.

Furthermore, as shown in FIG. 2, the dielectric constant regulation plate 30 can be formed into a complete plate-like shape in which any holes and the like are not formed, without forming any abovementioned pass-through portions. According to the dielectric constant regulation plate 30, the dielectric constant regulation layer (the dielectric constant regulation plate 30) having the predetermined dielectric constant is disposed on the whole surface on one surface side to the inlay 10, whereby the inlay 10 is designed to obtain suitable communication characteristics.

As described above the dielectric constant regulation plate 30 can suitably be designed and changed in accordance with the resin material forming the dielectric constant regulation plate 30 or the case 50, the communication characteristics of the inlay 10, and each article, use situation and the like where the RF tag 1 is to be used. Therefore, the pass-through portions may suitably be disposed, or such pass-through portions may not be disposed at all.

Therefore, from the viewpoints of e.g., ease of design or regulation of the dielectric constant regulation plate 30 which includes the formation of the pass-through portions, and stability of the communication characteristics, the dielectric constant regulation plate 30 is made of the same resin material as the case main body 51 and the lid section 52.

Needless to say, when optimum communication characteristics of the RF tag 1 are obtained, the dielectric constant regulation plate 30 and the case main body 51 and lid section 52 can be made of separate resin materials.

[Communication Characteristics]

Hereinafter, there will be described examples where operation confirmation was performed concerning the communication characteristics of the RF tag 1 according to one or more embodiments.

(Example 1)

A case 50 and a dielectric constant regulation plate 30 were made of weather-resistant AES resin, and a pass-through portion having a predetermined configuration was formed in the dielectric constant regulation plate, to prepare an RF tag 1. Furthermore, the RF tag 1 was mounted on a metal plate, to measure a communication distance of the RF tag in a usable communication frequency zone in each country. The respective frequency zones were an 865 to 870 MHz band in Europe, a 900 to 930 MHz band in the U.S., a 920 to 925 MHz band hi China, and a 950 to 960 MHz band in Japan. A case where the communication distance in the frequency zone was 7 m or more is shown by a double circle, a case where the communication distance was from 3 m to 7 m is shown by a circle, and a case where communication was impossible is shown by a cross. The results are shown in Table 1.

(Example 2)

A resin material of a case 50 and a material of a dielectric constant regulation plate 30 were made of weather-resistant polycarbonate resin, and the dielectric constant regulation plate 30 was formed into a shape different from that of Example 1, to regulate a dielectric constant, thereby preparing an RF tag 1. Furthermore, a communication distance of the RF tag in a usable communication frequency zone in each country was measured in the same manner as in Example 1. The results are shown in Table 1.

(Comparative Example)

A resin material of a case 50 was the same as that of Example 1, and an only inlay 10 was formed in a size which allowed the inlay to be sealed. An auxiliary antenna 20 and a dielectric constant regulation plate 30 were omitted in a prepared RF tag. Furthermore, a communication distance of the RF tag in a usable communication frequency zone in each country was measured in the same manner as in Example 1. The results are shown in Table 1.

TABLE 1

|  | Frequency zone | | | |
| --- | --- | --- | --- | --- |
|  | Europe | U.S. | China | Japan |
| Example 1 | ○ | ⊚ | ⊚ | ○ |
| Example 2 | ○ | ○ | ○ | ○ |
| Comparative Example | X | X | X | X |

As described above, two RF tags 1, which are the same as each other except the dielectric constant regulation plate 30 (the presence/absence or configuration of the pass-through portion) and the forming resin material, are used. In this case, the RF tags different from each other in communication distance peak and suitable zone can more suitably be constituted to four regions, i.e., Europe, the U.S., China and Japan where the usable communication frequency varies.

Therefore, the configuration of the pass-through portion of the dielectric constant regulation plate 30 is designed and changed in accordance with various conditions such as the type and communication characteristics of the inlay 10 for use, the material of the case 50 or the dielectric constant regulation plate 30 and the type of article using the RF tag 1, in addition to the communication frequency. Furthermore, when the dielectric constant regulation plate 30 is only selected and changed, the RF tag 1 can be used in various use environments and use situations.

As described above, according to the RF tag 1 of one or more embodiments of the present invention, the case 50 which receives and protects the inlay 10 comprises the dielectric constant regulation plate 30 which becomes the base on which the inlay 10 is to be mounted in the case, and the dielectric constant regulation plate 30 is constituted to be attachably/detachably and non-movably engaged to the case 50. In this way, the dielectric constant regulation plate 30 constituted separately from and independently of the case 50 is disposed, whereby the dielectric constant regulation plate 30 can be formed into any shape by using any material so that the dielectric constant regulation plate has the predetermined dielectric constant to the inlay 10 to be mounted thereon.

Furthermore, when the dielectric constant regulation plate 30 is changed or replaced, the communication characteristics of the inlay 10 to be mounted on the dielectric constant regulation plate 30 can be regulated, so that the communication characteristics of the inlay 10 can suitably be changed and regulated.

Therefore, for example, the shape and material of the dielectric constant regulation plate 30 are set in accordance with respective conditions such as the type and communication characteristics of the inlay 10, the material of the case 50, and each article, use environment and use frequency zone where the RF tag 1 is to be used. In this case, when the dielectric constant regulation plate 30 is only changed, the RF tag 1 can be used for a different article or can correspond to a different communication frequency. Therefore, the RF tag has a structure for a metal where the case 50 which protects the inlay 10 is disposed, and simultaneously, general-use properties and expandability of the RF tag can remarkably be improved.

Consequently, the dielectric constant regulation plate 30 can be formed and regulated so that the RF tag 1 can exert suitable communication characteristics even when the communication characteristics of the tag are influenced by electricity generated from an electricity meter or a metal constituting the electricity meter, in a case where the RF tag 1 is used in, e.g., the electricity meter to monitor a power consumption.

Furthermore, even when the IC chip 11 or the antenna 12 constituting the inlay 10 is different and hence the communication frequency becomes different, or even when the inlay 10 constituted of the same IC chip 11 and antenna 12 is used in, e.g., countries or districts in which the usable communication frequency zones are different from each other, the RF tag can be used by changing and regulating the dielectric constant regulation plate 30. Therefore, also when the RF tag 1 is used in, e.g., a container for a cargo to be conveyed to and used in such countries or districts as described above, the RF tag can be adapted to a plurality of different communication frequencies only by changing the dielectric constant regulation plate 30 while using the common case 50 and inlay 10.

Therefore, according to the RF tag 1 of one or more embodiments, in a structure or material fixedly and exclusively corresponding only to a specific metal article or communication frequency as in a conventional RF tag, all constitutional elements of the RF tag have to be changed or remade when the communication frequency, a use configuration, a use district or the like varies. In one or more embodiments the dielectric constant regulation plate 30 is changed. It is also possible to cope with a case where the article using the RF tag 1 or the communication frequency or use environment of the RF tag 1 varies, only by replacing or changing the dielectric constant regulation plate 30.

As described above, according to the RF tag 1 of one or more embodiments, it is possible to provide an RF tag of a structure for a metal which comprises the case 50 to protect the inlay 10. Furthermore, the RF tag 1 can be adapted to each of various articles, communication frequencies, use environments and the like, only by changing the dielectric constant regulation plate 30, even when a commercially available or general-use inlay is used as the inlay 10. Additionally, manufacturing cost of the whole RF tag can be reduced, and the existing general-use inlay can positively be used. Therefore, the whole tag can inexpensively be constituted. Consequently, it is possible to realize the RF tag for the metal which is excellent in general-use properties and expandability and can obtain suitable communication characteristics at low cost.

Next, one or more embodiments of the RF tag according to the present invention will be described with reference to FIGS. 5 to 9.

Figure 5A:
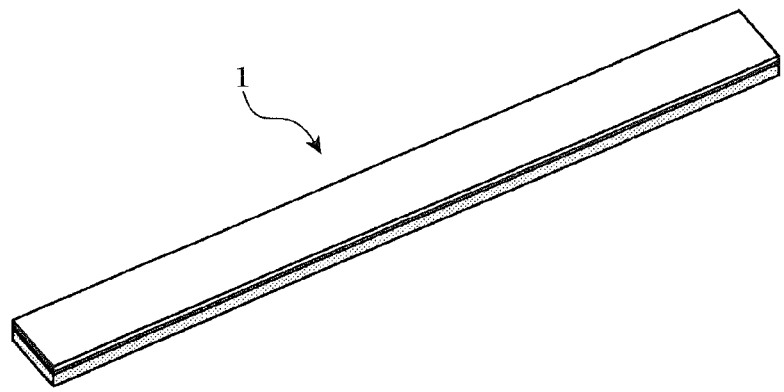
FIG. 5A is an appearance view showing an RF tag according to one or more embodiments of the present invention in a perspective view of a completed state of the RF tag
Figure 5B:
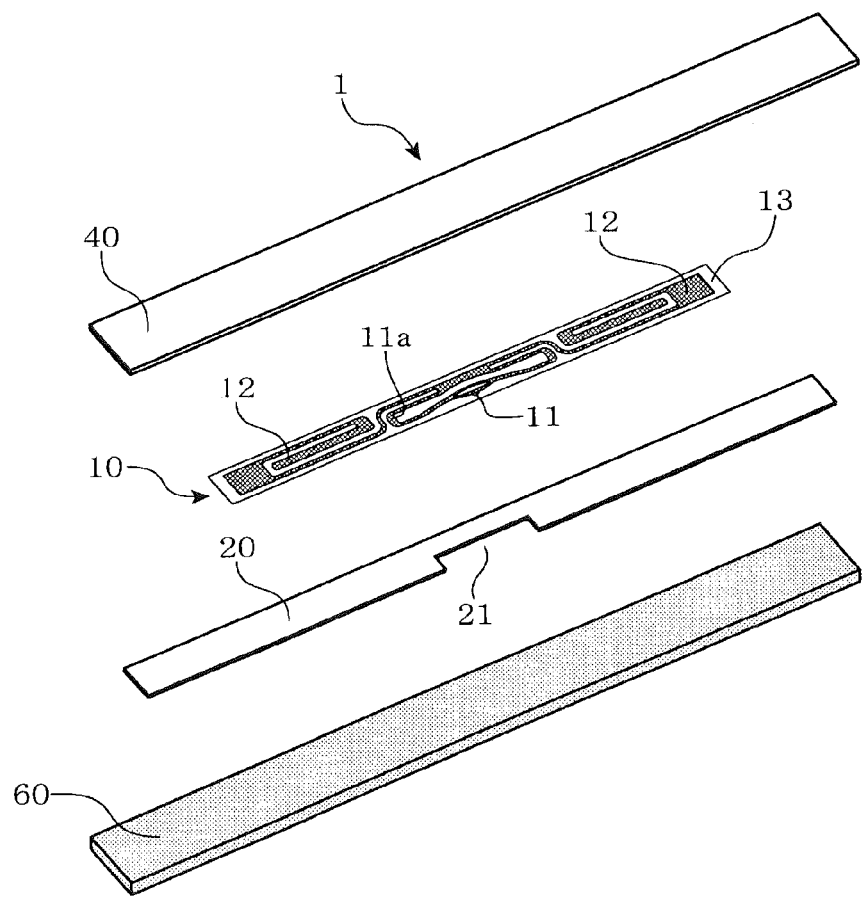
FIG. 5B is an appearance view showing an RF tag according to one or more embodiments of the present invention in a perspective view of a state where a surface layer, an inlay, an auxiliary antenna and a substrate constituting the RF tag are exploded
Figure 5C:
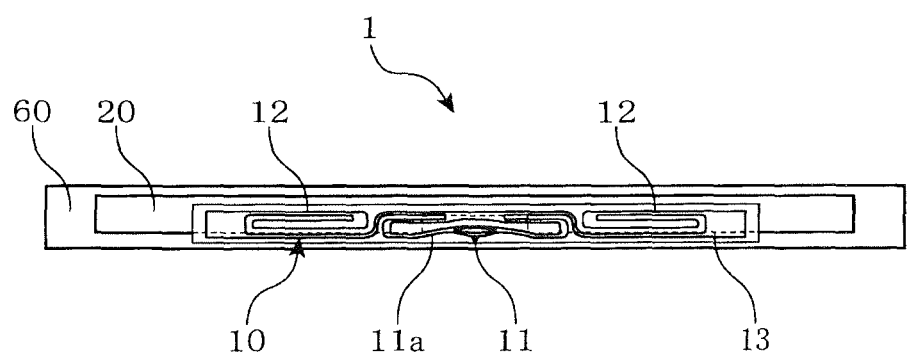
FIG. 5C is an appearance view showing an RF tag according to one or more embodiments of the present invention in a plan view of a state where the surface layer is removed from the RF tag of the completed state.

FIG. 5A through FIG. 5C are an appearance view showing the RF tag according to one or more embodiments of the present invention, FIG. 5A is a perspective view of a completed state of the RF tag, FIG. 5B shows a perspective view of a state where a surface layer, an inlay, an auxiliary antenna and a substrate constituting the RF tag are exploded, and FIG. 5C shows a plan view of a state where the surface layer is removed from the RF tag of the completed state.

As shown in the drawing, in an RF tag 1 according to one or more embodiments, an inlay 10 and a planar auxiliary antenna 20, which constitute the RF tag to perform radio communication, are arranged in a laminated state, and the inlay 10 and the auxiliary antenna 20, which are mounted on the surface of a substrate 60, are covered and protected by a surface layer 40, thereby constituting the RF tag 1.

Figure 9A:
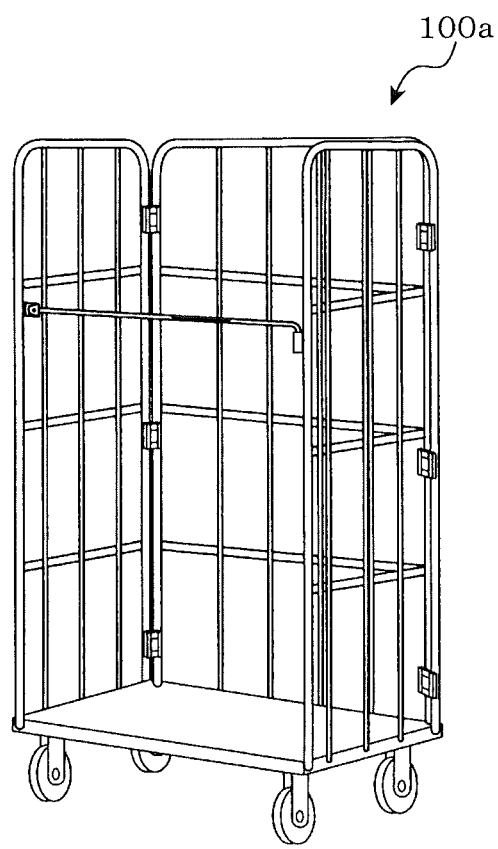
FIG. 9A shows views of articles or objects which become attaching objects of the RF tags according to one or more embodiments of the present invention in an appearance perspective view of a cage truck
Figure 9B:
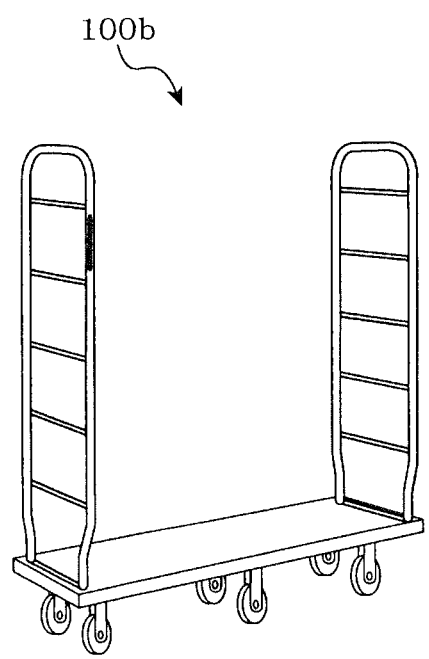
FIG. 9B shows views of articles or objects which become attaching objects of the RF tags according to one or more embodiments of the present invention in an appearance perspective view of a cart rack.

Furthermore, the RF tag 1 can be attached to and used on a curved portion of the surface of each of columnar members such as metal pipes forming such a cage truck 100a and a cart rack 100b as shown in FIG. 9A and FIG. 9B, for use in conveyance, storage and the like of commodities.

Specifically, as shown in FIGS. 5A to 5C, the RF tag 1 according to one or more embodiments is constituted of the inlay 10 comprising an IC chip 11 and an antenna 12; the planar auxiliary antenna 20 laminated on the inlay 10 in an insulating state to the inlay; the substrate 60 which becomes a substrate layer on which the laminated inlay 10 and auxiliary antenna 20 are mounted, and functions as a dielectric constant regulation layer for the mounted inlay 10; and the surface layer 40 which becomes a cover to cover the inlay 10 and the auxiliary antenna 20 which are mounted and laminated on the substrate 60.

Furthermore, in the RF tag 1 according to one or more embodiments, the substrate 60, which becomes the substrate layer and dielectric constant regulation layer to the inlay 10, has a flexibility to be attachable to the surface of a metallic columnar member, e.g., a columnar or elliptic columnar metal pipe having a predetermined curvature or a prismatic metal pipe, along a length direction in the form of a band in a surface contact state.

Hereinafter, the respective parts will be described in detail.

[Inlay]

As described above in one or more embodiments, the inlay 10 has the IC chip 11 and the antenna 12 electrically conductively connected to the IC chip U, and the IC chip 11 and the antenna 12 are mounted and formed on one sealing film 13 which becomes a substrate and is made of e.g., a PET resin. Afterward, another sealing film 13 is superimposed thereon, so that the IC chip and the antenna sandwiched between the two sealing films 13 are sealed and protected.

Also in one or more embodiments, there is used the rectangular inlay 10 sandwiching and sealing the IC chip 11 and the antenna 12 extending on both sides of the IC chip 11 between the rectangular sealing films 13.

Here, in the RF tag 1 of one or more embodiments, as a communication frequency band for use in the inlay 10, a 920 MHz band (915 to 930 MHz; a 15 MHz width) belonging to a so-called UHF band is picked up as a target.

As described also in one or more embodiments, as the frequency band for use in the RF tag, there are several types of frequency bands, e.g., a zone of 135 kHz or less, a 13.56 MHz band, an 860 to 960 MHz band belonging to the UHT band, and a 2.45 GHz band. Furthermore, a communication distance enabling the radio communication varies with the frequency band for use, and an optimum antenna length or a wiring pattern varies with the frequency band.

Further, for example, in Japan, a frequency band of the RF tag has been shifted from a heretofore used 950 MHz band (950 to 958 MHz; an 8 MHz width) to a 920 MHz band (915 to 930 MHz; a 15 MHz width) by the revision of the Radio Wave Law, and hence a utilizable frequency band has been enlarged.

Therefore, in one or more embodiments, the inlay 10 can be miniaturized and the after-mentioned auxiliary antenna 20 can be formed in a predetermined size, and based on such a relation, the UHF band having a short wavelength and enabling miniaturization of the antenna is picked up as a target. For example, a 920 MHz band is picked up as the target, and in this 920 MHz band, suitable communication characteristics can be obtained.

However, when there is not any restriction on the size of the inlay 10 or the auxiliary antenna 20, needless to say, a technical idea according to the present invention in itself is also applicable to a frequency zone other than the 920 MHz band and the UHF band.

[Auxiliary Antenna]

As described above in one or more embodiments, the auxiliary antenna 20 functions as an extra antenna to improve and regulate the communication characteristics of the inlay 10. Furthermore, as shown in FIGS. 5B and 5C, the auxiliary antenna is constituted of a planar conductive member laminated and disposed on one surface side of the inlay 10, and has an insulating state to the inlay 10 sealed with the resin by the sealing film 13.

Figure 6A:
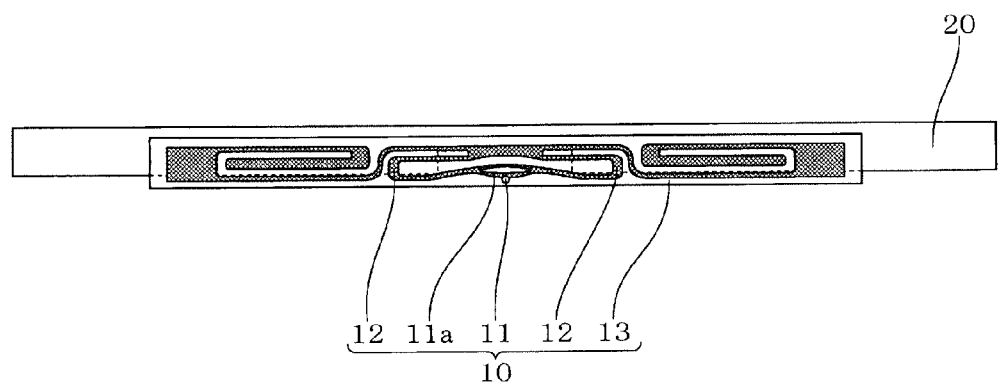
FIG. 6A is a plan view showing the auxiliary antenna of the RF tag according to one or more embodiments of the present invention in a state where the inlay is laminated on the auxiliary antenna
Figure 6B:
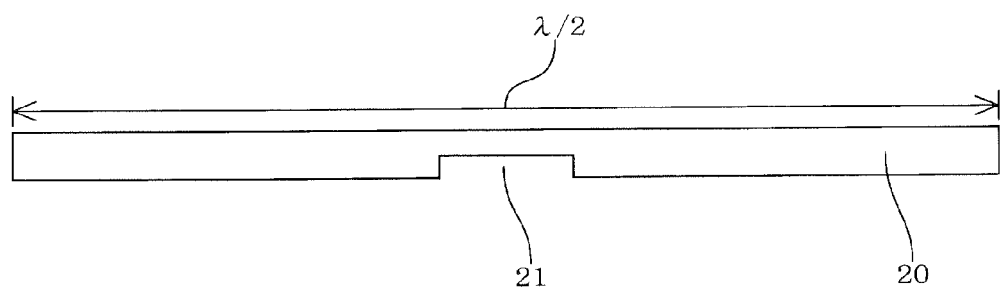
FIG. 6B is a plan view showing the auxiliary antenna of the RF tag according to one or more embodiments of the present invention in a dimensional relation between long sides of the auxiliary antenna.

FIG. 6A and FIG. 6B show a plan view of the auxiliary antenna according to one or more embodiments, the drawing FIG. 6A shows a state where the inlay 10 is laminated on the auxiliary antenna 20, and the drawing FIG. 6B shows a dimensional relation between long sides of the auxiliary antenna.

As shown in the drawings, in one or more embodiments, the auxiliary antenna 20 is formed into a rectangular planar shape (a band state) in which each short side has a length substantially equal to that of each short side of the inlay 10 and each long side is longer than each long side of the inlay 10.

Furthermore, the auxiliary antenna 20 of one or more embodiments is formed so that particularly the long side of the rectangular shape has a length of substantially ½ of a wavelength of a radio wave frequency of the inlay 10.

Furthermore, one of the long sides of the rectangular shape is provided with a cutout part 21 which divides the long side into two parts each having a length of substantially ¼ of the wavelength of the radio wave frequency of the inlay 10.

The cutout part 21 is formed into a concave shape which is opened in an edge portion of the one of the long sides of the auxiliary antenna 20 and has a predetermined width and depth to allow the IC chip 11 of the inlay 10 to be disposed therein.

First, as described in one or more embodiments, according to a principle of a patch antenna, the auxiliary antenna 20 can be matched by setting the length of each long side of the auxiliary antenna to a length of ½, ¼ or ⅛ of the wavelength of a communication radio wave. Furthermore, the entire size (length) of the RF tag 1 is substantially defined by the length of the auxiliary antenna 20. For example, when the length of the auxiliary antenna 20 is set to the length of ½ of the wavelength, the entire size (length) of the RF tag 1 is substantially a length of ½ of the wavelength or slightly larger (longer) than this length.

Here, as shown in FIG. 9A and FIG. 9B, the cage truck 100a or the cart rack 100b which becomes the attaching object of the RF tag 1 in one or more embodiments has a constitution where long metal pipes are perpendicularly arranged vertically and horizontally, and the RF tag 1 is disposed along a longitudinal direction of the metal pipe, so that a length of the RF tag 1 in the longitudinal direction can be absorbed. That is, the RF tag is disposed to the metal pipe along the pipe longitudinal direction.

Therefore, structural characteristics of the cage truck 100a or the cart rack 100b which becomes such an attaching object are rather utilized, whereby the size (length) of the auxiliary antenna 20 is set to an optimum size for the communication characteristics.

Consequently, in one or more embodiments, the length of each long side of the auxiliary antenna 20 is set to the length of substantially ½ of the wavelength of the radio wave frequency of the inlay 10. In consequence, the RF tag 1 can obtain the suitable communication characteristics.

Furthermore, as described in one or more embodiments, in a case where the planar auxiliary antenna 20 is laminated on the inlay 10, when the auxiliary antenna 20 is superimposed and positioned on the IC chip 11 of the inlay 10, the communication characteristics of the IC chip 11 are impaired by the conductive member forming the auxiliary antenna 20. That is, a loop circuit (a loop portion 11a) is formed in the vicinity of the IC chip 11 of the inlay 10, and the loop portion 11a has the purpose of matching an impedance and is disposed to perform communication by a magnetic field component. Therefore, it is necessary to prevent this magnetic field component from being disturbed by a conductor of the auxiliary antenna 20.

Consequently, also in one or more embodiments the cutout part 21 is formed so that the conductive member of the auxiliary antenna 20 is not present in a portion where the IC chip 11 is positioned, when the auxiliary antenna 20 is superimposed and laminated on the inlay 10.

Furthermore, in one or more embodiments, when the cutout part 21 is formed, the cutout part 21 is formed at the position which divides the long side of the auxiliary antenna 20 into two parts each having a length of substantially ¼ of the wavelength of the radio wave frequency of the inlay 10, i.e., at a central position of the long side.

More specifically, when the communication frequency of the inlay 10 which is picked up as a target in one or more embodiments is 920 MHz, λ nearly equals 326.0 mm, λ/2 nearly equals 163.0 mm, and λ/4 nearly equals 81.5 mm.

Therefore, the auxiliary antenna 20 is formed so that the length of each long side is around 163.0 mm, whereby one long side provided with the cutout part 21 is divided into two parts each having a length of around 81.5 mm.

Here, also in the inlay 10 according to one or more embodiments a structure including the PET layer sandwiched between the auxiliary antenna 20 as the conductor and the antenna 12 of the inlay 10 produces a wavelength shortening effect. When this PET layer is utilized, an apparent wavelength is shortened. A specific dielectric constant of PET is about "4".

In consequence, the length of the long side of the auxiliary antenna 20 in one or more embodiments also has an approximate value, and the value of substantially λ/2 or substantially λ/4 is sufficient. Therefore, the length varies sometimes in accordance with a change of the communication characteristics due to a material or dielectric constant of the substrate 60 of the RF tag 1 or a use environment, use configuration or the like of the tag.

Therefore, the auxiliary antenna 20 of one or more embodiments can be formed so that, for example, a length of each long side is 135 mm, a width of the cutout part 21 is 15.5 mm, and each of two parts of the long side divided by the cutout part 21 has a dimension of 59.75 mm.

Furthermore, the cutout part 21 formed in the auxiliary antenna 20 is set on the basis of a dimension of the inlay 10 for use, and a width and depth of the cutout part are set so that the conductive member of the auxiliary antenna 20 is not superimposed on the portion of the IC chip 11 of the inlay 10, as described in one or more embodiments.

Specifically, the width of the cutout part 21 is set on the basis of a width of the loop portion 11a of the IC chip 11 of the inlay 10, and a size of the cutout part is set so that the conductor of the auxiliary antenna 20 is not superimposed on the IC chip 11 and the loop portion 11a or so that the conductor is not superimposed on the IC chip 11 but is superimposed on a part of a peripheral edge of the loop portion 11a. For example, when a size of the width of the loop portion 11a is from about 15 to 18 mm, the width of the cutout part 21 is a length in a range of about 10 to 20 mm (e.g., 15.5 mm described above).

Furthermore, the depth of the cutout part 21 is set on the basis of the width of the inlay 10 and the auxiliary antenna 20 (a length of a short direction) and a position of an upper portion of the loop portion 11a so that the antenna conductor is not superimposed on at least the IC chip 11. For example, when the width of the inlay 10 and the auxiliary antenna 20 is from about 7 to 10 mm, the depth of the cutout part 21 is a length in a range of about 2 to 5 mm (e.g., 3.0 mm).

It is to be noted that also in one or more embodiments, the auxiliary antenna 20 can be formed in a mesh state or the like, a function of the antenna is not impaired by a skin effect, and an area of the whole conductor portion of the auxiliary antenna 20 can be reduced.

[Substrate]

The substrate 60 is a member which becomes a substrate layer on which the laminated inlay 10 and auxiliary antenna 20 are mounted, and functions as a dielectric constant regulation layer for the mounted inlay 10. In one or more embodiments, the substrate is formed into a band which is one size larger than an outer shape of the laminated inlay 10 and auxiliary antenna 20 so that the inlay 10 and the auxiliary antenna 20 can be mounted and laminated without protruding.

Furthermore, the substrate 60 has a predetermined flexibility and softness, and the substrate can be disposed and attached not only to the surface (a flat surface) of a prismatic metal pipe but also to a curved surface portion of a metal pipe or the like forming the cage truck 100a or the cart rack 100b shown in FIG. 9A and FIG. 9B, along a pipe longitudinal direction in a surface contact state.

On one surface side (an upper surface side of FIG. 5B and FIG. 5C) of the substrate 60, the auxiliary antenna 20 and the inlay 10 are laminated and arranged. Furthermore, one surface (an upper surface) of the substrate 60 on which the inlay 10 and the auxiliary antenna 20 are mounted and laminated is covered and coated with the surface layer 40 which becomes a cover member. In consequence, the inlay 10 and the auxiliary antenna 20 laminated and sandwiched between the substrate 60 and the surface layer 40 are sealed and protected from the outside.

The surface layer 40 is a sheet-like member to be attached and bonded to the one surface of the substrate 60 on which the inlay 10 and the auxiliary antenna 20 are mounted, and can be formed by using a sheet material or a film material having a flexibility and made of, e.g., paper or synthetic paper, or a resin such as polyethylene, polyethylene terephthalate (PET), polypropylene or polyimide.

On the other hand, the other surface side (a lower surface side of FIG. 5B and FIG. 5C) of the substrate 60 is provided with an adhesive material constituted of a double-sided tape (an adhesive tape) or the like which is not especially shown in the drawing, and the substrate is attached to the surface of the metal pipe which becomes an attaching object by an adhesive force of the adhesive material. In consequence, the RF tag 1 is disposed and secured to the surface of the metal pipe so that the substrate 60 is attached to the surface of the attaching object via the adhesive material and does not easily peel off.

Figure 7A:
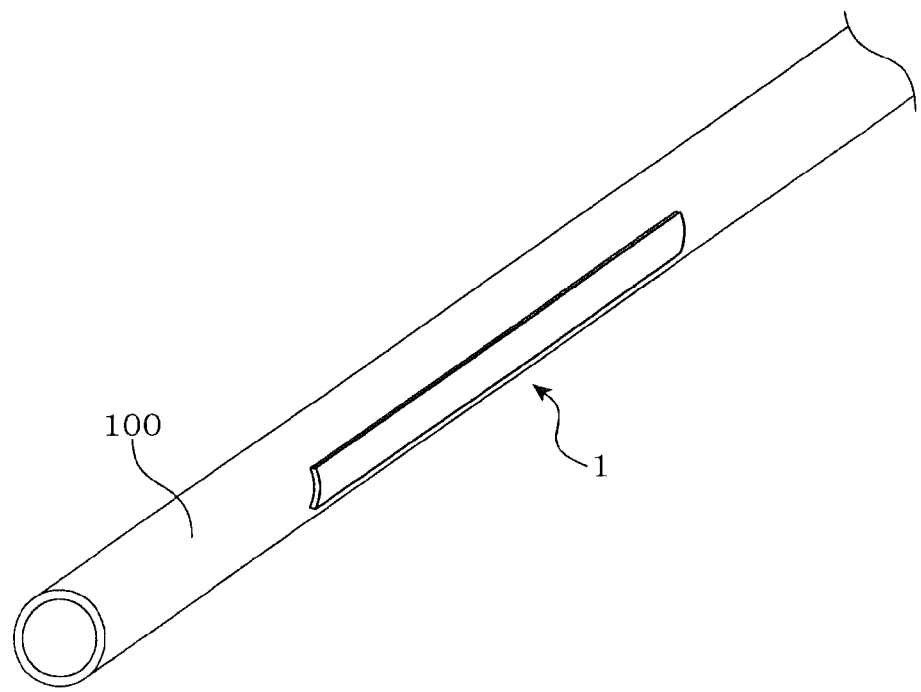
FIG. 7A is an appearance view of a state where the RF tag according to one or more embodiments of the present invention is attached to the surface (a curved surface) of an object in a main part perspective view of a state where the RF tag is attached to a metal pipe along a longitudinal direction of the metal pipe
Figure 7B:
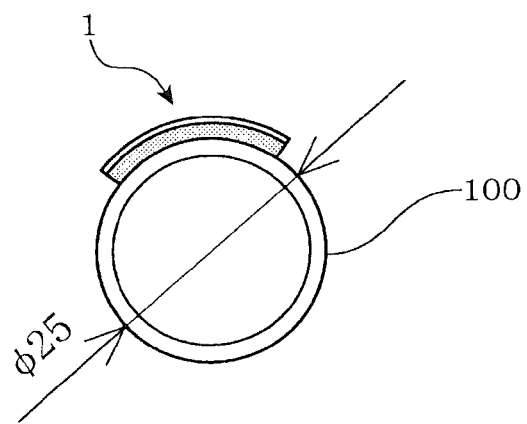
FIG. 7B is an appearance view of a state where the RF tag according to one or more embodiments of the present invention is attached to the surface (a curved surface) of an object in a front view of the same metal pipe seen from an end face side of the metal pipe.

FIG. 7A and FIG. 7B shows a state where the RF tag 1 according to one or more embodiments is disposed and attached to a metal pipe along a longitudinal direction of the metal pipe.

The substrate 60 described above is formed to have a predetermined specific dielectric constant which regulates the communication characteristics of the inlay 10 laminated together with the auxiliary antenna 20, whereby the substrate 60 functions as a dielectric constant regulation layer for the inlay 10 mounted and laminated on the substrate.

For example, when the substrate 60 is formed in a predetermined thickness by using a predetermined member, the substrate can be formed as the dielectric constant regulation layer having the specific dielectric constant suitable for the communication characteristics of the inlay 10.

In consequence, a material and the thickness of the substrate 60 are suitably selected in consideration of various conditions such as a type and communication characteristics of the inlay 10 for use and each article, use environment, use frequency zone and the like where the RF tag 1 is used, and the substrate 60 is only selected and changed. In this case, the RF tag 1 can be used in a different article or can be adapted to a different communication frequency.

Here, the substrate 60 has a specific dielectric constant of 1.0 or more and 1.8 or less, or 1.0 or more and 1.5 or less.

Furthermore, the substrate 60 has a thickness of 1.5 mm or more and 2.0 mm or less, or 1.6 mm or more and 1.8 mm or less.

In general, there is a tendency that when the specific dielectric constant of the member constituting the substrate 60 heightens, a hardness of the member also heightens, and the softness and flexibility are deteriorated. Furthermore, even when the thickness of the substrate 60 is large, the softness and flexibility are similarly deteriorated. As a result, when the substrate 60 is attached to, e.g., the curved surface portion of the metal pipe forming the cage truck 100*a* or the cart rack 100*b*, it is difficult to deform and curve the substrate 60 along the curved surface. Furthermore, a substrate edge portion disadvantageously separates upwardly, the substrate itself bends, and hence the substrate cannot be brought into surface contact with the curved surface.

On the other hand, when the specific dielectric constant of the substrate 60 is excessively low and the thickness thereof is excessively small, an influence from a metal which becomes the attaching object cannot be avoided. Furthermore, the substrate 60 cannot function as the dielectric constant regulation layer to the inlay 10, and it is difficult to improve the communication characteristics of the RF tag 1.

Therefore, in one or more embodiments, to obtain an optimum range in which the influence of the metal can be avoided to improve the communication characteristics of the RF tag 1 while acquiring the softness and flexibility of the substrate 60, the substrate 60 is formed so that the specific dielectric constant is 1.0 or more and 1.8 or less, or 1.0 or more and 1.5 or less so that the thickness is 1.5 mm or more and 2.0 mm or less and 1.6 mm or more and 1.8 mm or less.

The substrate 60 is formed to have such ranges of the specific dielectric constant and the thickness, so that the predetermined softness and flexibility can be imparted to the substrate 60, and the substrate can be attached and bonded not only to the surface (the flat surface) of a prismatic metal pipe but also to, e.g., the curved surface portion of the metal pipe forming the cage truck 100*a* or the cart rack 100*b*, in the surface contact state (see FIG. 7B).

Furthermore, the substrate 60 has such ranges of the specific dielectric constant and thickness, so that the influence from the metal which becomes the attaching object of the RF tag 1 can be avoided and absorbed by the substrate 60. Furthermore, such suitable communication distance and communication range as described later can be obtained as the communication characteristics of the RF tag 1 (see FIG. 8A and FIG. 8B).

Here, the attaching object of the RF tag 1 of one or more embodiments is each of columnar members such as the metal pipes forming the cage truck 100*a* and the cart rack 100*b*, and the inside thereof has a hollow tubular shape as shown also in FIG. 7A and FIG. 7B. Due to such a hollow tubular shape, an electric circuit is constituted via the inside of the metal pipe. Furthermore, when a cross section of the electric circuit enlarges, the impedance decreases. Additionally, the influence of the metal on the RF tag 1 disposed on the surface of a tubular member is lower as compared with a non-hollow (solid) metal.

In the non-hollow (solid) metal, e.g., a rod-like member made of a metal or a metal object having a thickness of several centimeters or more, such decrease of the impedance as in the abovementioned hollow tubular member does not occur. Therefore, to acquire the communication characteristics of the RF tag 1, the specific dielectric constant of the dielectric constant regulation layer needs to be 2 or 3 or more. The member having such a specific dielectric constant usually has a high hardness. Therefore, when the substrate is formed by using such a member, the softness and flexibility cannot be obtained, and it is difficult to form a thin substrate.

Furthermore, standards of the metal pipes forming the cage truck 100*a* and the cart rack 100*b* are usually unified, and a metallic pipe having a diameter of 25 mm is used as the columnar member which constitutes the metal pipe and whose surface becomes a curved surface having a curvature of 80 (r=12.5 mm).

Therefore, one or more embodiments specializes for a hollow metallic columnar member, e.g., the metal pipe forming the cage truck 100*a* or the cart rack 100*b* as the attaching object, and hence as the substrate 60 capable of acquiring the communication characteristics of the RF tag 1 in a suitable state, the substrate 60 having the specific dielectric constant and the thickness in the above predetermined ranges has been employed.

Figure 8A:
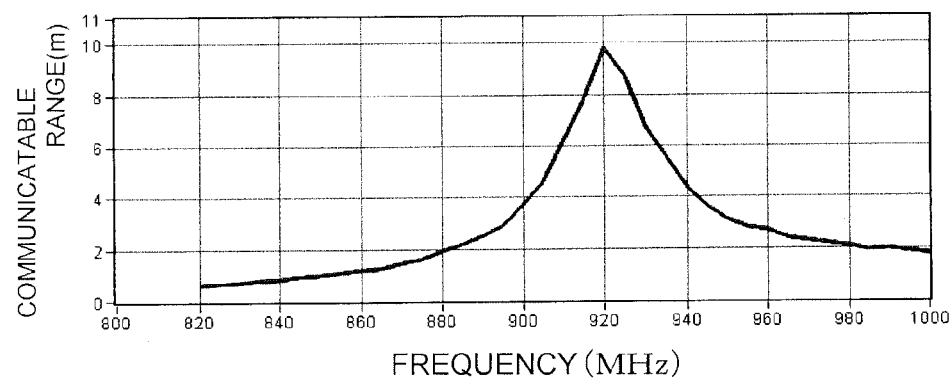
FIG. 8A is an explanatory view showing communication characteristics of the RF tag according to one or more embodiments of the present invention in a polygonal line graph showing a relation between a communicatable range and a frequency
Figure 8B:
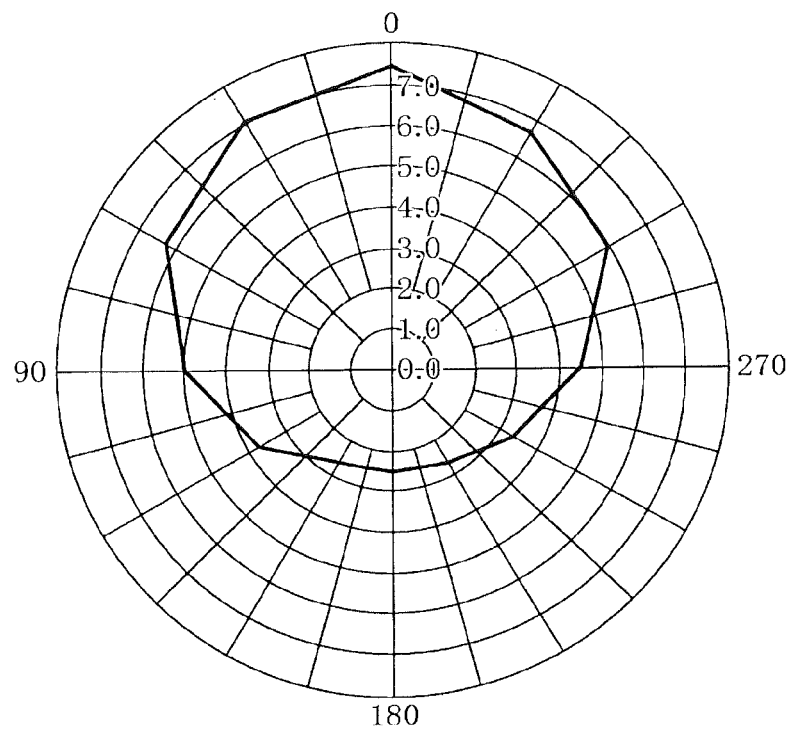
FIG. 8B is an explanatory view showing communication characteristics of the RF tag according to one or more embodiments of the present invention in a polar coordinate graph showing a relation between a communication distance and an angle.

When the substrate 60 is employed and the RF tag 1 using a communication frequency of a 920 MHz band is attached to the cage truck 100*a* or the cart rack 100*b* comprising the metal pipe having a diameter of 25 mm and a curvature of 80 (r=12.5 mm), the communication can suitably be performed in a range of 7 m or more and 10 m or less (see FIG. 8A and FIG. 8B). Furthermore, the RF tag 1 can be disposed and attached to the surface of the metal pipe in the surface contact state, because the substrate 60 is curvedly bent (see FIG. 7A and FIG. 7B).

It is to be noted that needless to say, the substrate 60 can be disposed and attached to a flat planar portion in the surface contact state, and also needless to say, the substrate can be attached to the surface (a flat surface) of a prismatic metal pipe in the surface contact state. Furthermore, needless to say, the columnar metal pipe is not limited to a truly round columnar pipe, and may be an elliptic columnar pipe.

The substrate 60 according to one or more embodiments described above can be formed by using a crosslinked polyolefin foaming material such as foamed polyethylene or foamed polypropylene.

Furthermore, the substrate 60 can be constituted of a single band-like member made of the above crosslinked polyolefin foaming material, or a plurality of (e.g., two layers) band-like members can be superimposed on each other to constitute one substrate 60.

[Communication Characteristics]

The communication characteristics of the RF tag 1 according to one or more embodiments having such a constitution as described above will be described with reference to FIG. 8A and FIG. 8B.

FIG. 8A and FIG. 8B show the results obtained by conducting a communication distance evaluation of the RF tag 1 according to one or more embodiments which is attached to the surface of the metal pipe having a diameter of 25 mm (a curvature of 80 (r=12.5 mm)) and forming the cage truck 100a or the cart rack 100b, along the pipe longitudinal direction.

As apparent from the drawing FIG. 8A, it is seen that in the RF tag 1 according to one or more embodiment, 920 MHz is a peak and a communication distance of about 10 in can be obtained.

Furthermore, as apparent from the drawing FIG. 8B, in the RF tag 1 according to one or more embodiments, it is seen that a communication distance of 7 m or more can be obtained at a peak of a position of 0° (right in front) to the reader/writer, and a communication distance of about 5 m can be obtained also at a (directly horizontal) position of 90° or 270°. Furthermore, a communication distance of 1 in or more can be obtained also at a position of 180° (right behind).

As described above, according to the RF tag 1 of one or more embodiments of the present invention, the substrate 60 constituting the RF tag 1 to be attached to and used on the metal is formed to have a predetermined softness and flexibility and have a predetermined specific dielectric constant, whereby the tag can also be disposed and attached to a columnar member such as the metal pipe having a predetermined curvature, along the longitudinal direction of the columnar member, so that the suitable communication characteristics can be obtained.

In consequence, the communication can be performed in a long and broad range at a specific communication frequency (the 920 MHz band) without requiring any large or excessive cover, case, holder or the like, while avoiding the influence from the metal pipe. Furthermore, even when an attaching portion is a curved surface, the tag can be attached thereto in the surface contact state without causing any peel, drop-out or the like.

Therefore, it is possible to realize the RF tag which is to be suitably attached particularly to the curved portion of the surface of the metal pipe forming the cage truck, the cart rack or the like.

One or more embodiments of the RF tag of the present invention and the metal container have been described above, but the RF tag according to the present invention is not limited only to the abovementioned embodiments, and needless to say, various changes can be made in the gist of the present invention.

For example, as examples of each article using the RF tag according to the present invention, the electricity meter and the container for the cargo have been described above in one or more embodiments, and the cage truck and the cart rack constituted of the metal pipes have been described in one or more embodiments. However, the articles and objects that can use the RF tags of the present invention are not restricted to the electricity meter, the container, the cage truck and the cart rack.

That is, the RF tag according to one or more embodiments of the present invention is applicable to each of various articles and objects, as long as each of the articles and the objects uses the RF tag and the predetermined information or data of the articles and objects is read and written via the reader/writer. For example, the RF tag according to one or more embodiments is applied to each of the articles and objects comprising the columnar members and the metal pipes including the curved surfaces having the predetermined curvatures, and is usable for each of metallic pallets, pipe chairs, pipe beds, foldable trucks, bicycles and the like in addition to the cage trucks and the cart racks.

One of more embodiments of the present invention can suitably be utilized as an RF tag for a metal which is attached to and used on each of various articles and objects such as electricity meters and containers for cargos and which has a structure where an inlay of the RF tag is received and sealed in a case to improve a weather resistance and a water repellence.

Furthermore, one or more embodiments of the present invention can suitably be utilized as an RF tag for a metal which is attached to and used on each of various articles and objects such as cage trucks and cart racks, especially which is attached to each of articles and objects comprising columnar members and metal pipes including curved surfaces having predetermined curvatures.

Several embodiments and/or examples of the present invention have been described above in detail, but it is easy for a person skilled in the art to add many changes to these illustrated embodiments and/or examples without substantially departing from inventive teachings and effects of the present invention. Therefore, these many changes are included in the scope of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An RF tag comprising:
   an inlay comprising an IC chip and an antenna;
   a planar auxiliary antenna laminated on the inlay in an insulating state to the inlay;
   a dielectric constant regulation plate which becomes a base on which the inlay including the auxiliary antenna laminated thereon is mounted, and functions as a dielectric constant regulation layer for the mounted inlay; and
   a case which receives therein the dielectric constant regulation plate in a state where the inlay including the auxiliary antenna laminated thereon is mounted, wherein
   the dielectric constant regulation plate is formed into a shape which allows the dielectric constant regulation plate to be attachably/detachably and non-movably engaged in the case and which allows the dielectric constant regulation plate to have a predetermined dielectric constant which regulates communication characteristics of the inlay including the auxiliary antenna laminated thereon.

2. The RF tag according to claim 1, wherein
   the auxiliary antenna is formed into a rectangular planar shape including long sides each having a length of substantially ¼ of a wavelength of a radio wave frequency of the inlay, and has a cutout part which divides one of the long sides into two parts each having a length of substantially ⅛ of the wavelength of the radio wave frequency of the inlay, and the cutout part is formed into a concave shape which is opened in an edge portion of the one of the long sides and has a predetermined width and depth to allow the IC chip of the inlay to be disposed therein.

3. The RF tag according to claim 1, wherein the dielectric constant regulation plate comprises pass-through portions to pass through the dielectric constant regulation plate, in predetermined portions of a mounting surface on which the inlay is mounted, and has dielectric substances partially arranged to the RF tag to be mounted.

4. The RF tag according to claim 1, wherein the case comprises a case main body comprising a concave portion which non movably receives the dielectric constant regulation plate on which the inlay is mounted, and a lid section which closes an opening of the concave portion of the case main body, and the case main body and the lid section are made of the same resin material.

5. The RF tag according to claim 4, wherein the dielectric constant regulation plate is made of the same resin material as the case main body and the lid section.

6. An RF tag comprising:
an inlay comprising an IC chip and an antenna;
a planar auxiliary antenna laminated on the inlay in an insulating state to the inlay; and
a substrate which becomes a substrate layer on which the laminated inlay and auxiliary antenna are mounted, and functions as a dielectric constant regulation layer for the mounted inlay, wherein the substrate has a flexibility to he attachable to the surface of a metallic columnar member along a length direction in the form of a band in a surface contact state, the auxiliary antenna is formed into a rectangular planar shape including long sides each having a length of substantially ½ of a wavelength of a radio wave frequency of the inlay, and has a cutout part which divides one of the long sides into two parts each having a length of substantially ¼ of the wavelength of the radio wave frequency of the inlay, and the cutout part is formed into a concave shape which is opened in an edge portion of the one of the long sides and has a predetermined width and depth to allow the IC chip of the inlay to be disposed therein.

7. The RF tag according to claim 6, wherein a specific dielectric constant of the substrate is 1.0 or more and 1.5 or less.

8. The RF tag according to claim 6, wherein the surface of the columnar member is constituted of a curved surface having a curvature of 80 (r=12.5 mm).

9. The RF tag according to claim 6, wherein the columnar member is constituted of a metal pipe having a diameter of 25 mm.

* * * * *